United States Patent [19]

Ellestad et al.

[11] 4,337,230
[45] Jun. 29, 1982

[54] METHOD OF ABSORBING SULFUR OXIDES FROM FLUE GASES IN SEAWATER

[75] Inventors: Arne Ellestad, Oslo; Arvid Tokerud, Lillestrøm, both of Norway

[73] Assignee: AB Svenska Fläktfabriken, Nacka, Sweden

[21] Appl. No.: 232,017

[22] Filed: Feb. 6, 1981

[30] Foreign Application Priority Data

Feb. 13, 1980 [NO] Norway ................................. 800385

[51] Int. Cl.$^3$ ............................................. C01B 17/00
[52] U.S. Cl. ..................................................... 423/242
[58] Field of Search ............... 423/242 A, 242 R, 243, 423/244 A, 244 R, 166

[56] References Cited

U.S. PATENT DOCUMENTS

| 3,389,829 | 6/1968 | Starford | 423/242 |
| 3,781,407 | 12/1973 | Kamijo et al. | 423/242 |
| 3,944,649 | 3/1976 | Field et al. | 423/166 |
| 3,980,756 | 9/1976 | Dixson et al. | 423/166 |

OTHER PUBLICATIONS

L. A. Bromley, Int. J. Sulfur Chemistry, Part B, vol. 7, No. 1, 1972, pp. 77–84.

"The Flakt-Hydro Process Sulfur Dioxide Removal by Seawater" Oct. 1978.

B. Colliander, "Status Report per Apr. 1, 1978, Concerning Desulfurization of Flue Gas", 1978.

A. Litter, "Flue Gas Washing at Power Stations in the U.K. 1933–1977", Jul. 1976.

F. Kelly, "Design and Operation of a Counter Current Gas Scrubbing System" Australian Inst. Min. Metals, (1949), pp. 17–37.

*Primary Examiner*—O. R. Vertiz
*Assistant Examiner*—Gregory A. Heller
*Attorney, Agent, or Firm*—Scully, Scott, Murphy & Presser

[57] ABSTRACT

A method of absorbing sulfur oxides from flue gases in seawater, comprising adding to the seawater calcium based alkali subsequent to the absorption, and then introducing the seawater to which alkali has been supplied into a decarbonation/oxidation reactor to which an oxygen-containing gas is supplied in order to oxidize sulfur oxides in the seawater and to strip carbon dioxide from the seawater. When the seawater has been removed from the decarbonation/oxidation reactor, calcium based alkali is again added to the seawater in order to increase its pH.

9 Claims, No Drawings

METHOD OF ABSORBING SULFUR OXIDES FROM FLUE GASES IN SEAWATER

BACKGROUND OF THE INVENTION

The invention relates to a method of removing sulfur oxides from flue gases by absorption in seawater which is then treated so that the seawater may be returned to the recipient without damage to the marine environment.

The principle of using seawater as absorbent for acid gases, like $SO_2$, is not novel. The Electrolytic Zinc Company of Tasmania has used seawater in order to remove sulfur dioxide from melting plant flue gases since 1949 (F. H. C. Kelly, Proc. Aust. Inst. Min. Metall, N.J. Nos. 152-153, 17-39 (1949). Design and Operation of a Counter Current Gas Scrubbing System). Absorption takes place by contacting gas and liquid e.g. in a so called packed counter-current tower. Seawater is well suited for absorbing $SO_2$ due to the natural alkalinity of the seawater. Normally, seawater has a pH of from about 8.0 to 8.3 and an alkalinity of from 2.2 to 2.4 milliequivalents/liter (meq./l). By the absorption of $SO_2$ the acid addition is buffered thereby that the equilibria:

$$CO_2(g) \rightleftharpoons CO_2(l) \quad (1)$$

$$CO_2(l) + H_2O \rightleftharpoons HCO_3^- + H^+ \quad (2)$$

$$HCO_3^- \rightleftharpoons CO_3^{2-} + H^+ \quad (3)$$

move to the left.

In natural seawater most of the carbon dioxide is present as bicarbonate, and the alkalinity of the seawater essentially derives therefrom that the bicarbonate may be transferred into $CO_2(l)$ according to equation 2.

$SO_2$ is present in the liquid as $SO_2(l)$, $HSO_3^-$ and $SO_3^{2-}$ dependent upon the equilibria:

$$SO_2(g) \rightleftharpoons SO_2(l) \quad (4)$$

$$SO_2(l) + H_2O \rightleftharpoons HSO_3^- + H^+ \quad (5)$$

$$HSO_3^- \rightleftharpoons SO_3^{2-} + H^+ \quad (6)$$

If oxygen is dissolved in the liquid, the sulfite ion will react with oxygen in agreement with equation 7.

$$SO_3^{2-} + \tfrac{1}{2}O_2(l) \rightarrow SO_4^{2-} \quad (7)$$

This implies that effluent consisting of untreated seawater used as absorbent for $SO_2$ will consume some of the oxygen content of the recipient.

The oxidation reaction has been studied in several scientific works. The reaction takes place in several stages, and equation 7 only discloses the gross reaction. The rate of reaction increases with increasing pH and with increasing sulfite concentration whereas the oxygen concentration usually has little influence on the rate of reaction.

The proportion of dissolved sulfur dioxide which is present as sulfite increases with increasing pH. For the same total sulfur dioxide concentration the sulfite concentration increases with increasing pH and, accordingly, pH is a very important parameter.

The reaction (7) is catalyzed by polyvalent cations, inter alia Fe, Mn, Cu and Co. The reaction is also catalyzed by one or more of the intermediate products of the reaction.

The effect of an oxygen-demanding and acid effluent will depend upon several circumstances, like local recipient conditions, wind and current conditions, the concentration levels of the effluent, the magnitude of the effluent, the effluent arrangement and upon possible treatment of the seawater before it is discharged.

At the above-mentioned plant in Tasmania acid seawater is discharged from the scrubbers to the recipient in the untreated state.

At Bankside Power Station in England water from the river Thames is used in order to absorb $SO_2$ from the flue gas (Litter, A. Central Electricity Generating Board, "Flue Gas Washing at Power Stations in the U.K.", July 1976). Approximately 1/10 of the cooling water which is used in the turbine condensers is pumped to the gas scrubbers. Limestone is added in order to increase the absorptive capacity of the liquid. The liquid from the scrubbers flows through a settling tank in order to remove particulate material. The liquid is then introduced into an aeration tank wherein sulfite ions are oxidized to sulfate ions (equation 7). Manganese sulfate is added as catalyst. The residence time of the liquid in the aeration tank is about 7 minutes. Following the aeration tank the liquid has a pH of about 2.3 and contains $SO_2$ in an amount of about 44 mg/l which corresponds to an oxygen consumption of about 11 mg $O_2$/l.

The scrubbing water is then mixed with the rest of the cooling water before it is again discharged into the Thames.

At Bankside the pH of the effluent from the aeration tank is as low as 2.3. The pH of the liquid which enters the tank is higher, however, during the oxidation the relatively weak acid, sulfurous acid, is in principle transformed into the strong acid, sulfuric acid, with consequential lowering of pH. Accordingly, the reaction is slow and it is necessary with a reaction period of about 7 minutes in the aeration tank and a significant catalyst addition. Both for economic and spacial reasons it is desirable to reduce the residence time, i.e. to reduce the size of the oxidation apparatus.

In U.S. Pat. No. 4,085,194 a process is disclosed for removing $SO_2$ from waste gases by contacting the gas with seawater in a gas scrubber, e.g. seawater which previously has been used as cooling water in a thermal power plant. Seawater is used in a such amount that the amount of sulfur dioxide absorbed by the seawater is significantly smaller than the total alkali equivalent of the seawater. This implies that for a power plant combusting coal containing from 1.0 to 1.5% S the entire amount of cooling water from the turbine condensers must be used in the gas scrubber.

The $SO_2$-containing seawater is then contacted with an oxygen-containing gas for decarbonating the seawater in order to increase the pH of the seawater to the neutral range, pH of from 6 to 7, and in order to oxidize sulfite ions to sulfate ions.

When acidifying seawater the equilibria according to the above-mentioned equations 1, 2 and 3 are displaced to the left whereby also the partial pressure of $CO_2$ above the solution increases. The partial pressure of $CO_2$ increases most strongly in the pH range of from 8 and down to 5. The partial pressure at pH 2 is then 1.1 times higher than at pH 5 and 200 times higher than at pH 8.

When contacting acidified seawater with e.g. air $CO_2$ is transferred from the seawater to the air, so called decarbonation. This implies that the equilibria according to equations 1, 2 and 3 are further displaced towards the left, i.e. that H+-ions are consumed with increasing pH.

If seawater is used in such an amount that the amount of sulfur dioxide which is absorbed in the seawater is substantially smaller than the total alkali equivalent of the seawater, a pH increase due to decarbonation may superimpose the lowering of pH due to the oxidation reaction, as disclosed in said U.S. patent specification.

It is a disadvantage of the described process that it presupposes that large amounts of seawater are to be used both in the absorption unit and in the decarbonation/oxidation unit. This implies an increase of the process equipment and high operation costs. It might be desirable to discharge the treated seawater into deep water by means of diffusers in order to obtain a rapid dilution and to avoid influencing the biologically productive surface layer. However, this is very expensive when large amounts of liquid are to be discharged.

Flue gases normally contain from 10 to 15% by volume of $CO_2$. Some $CO_2$ will be absorbed in the gas scrubber. When increasing the ratio between liquid and gas in the scrubber higher amounts of $CO_2$ will be absorbed, and there will then also be higher amounts of $CO_2$ which have to be removed in the decarbonation/oxidation unit. This increases the required size of the unit.

In an article in International Journal of Sulfur Chemistry (L. A. Bromley, Int. J. Sulfur Chemistry, Part B, Vol 7, Number 1 (1972) a process of desulfurizing flue gases from power plants is disclosed. The process is relatively equal to the process disclosed in the above-mentioned U.S. patent specification. In the gas scrubber amounts of seawater are used corresponding to the amount of cooling water for the power plant. The pH of the seawater as it leaves the gas scrubber will normally be about 6. However, it is suggested that limestone, dolomite or other forms of alkali may be added if the seawater leaving the gas scrubber is too acidic.

In the so called Fläkt-Hydro process (brochure published in October 1978 by A/S Norsk Viftefabrikk, Oslo, Norway, "The Fläkt-Hydro Process Sulfur Dioxide Removal by Seawater") only about 1/5 of the amount of cooling water from a thermal power plant is normally used in the gas scrubber for absorption of $SO_2$. The $SO_2$-containing seawater is subsequent to the absorption mixed with the remainder of the amount of cooling water before the entire amount is introduced into a decarbonation/oxidation unit.

The above-mentioned seawater processes have in common that the natural alkalinity of the seawater is essentially used in order to absorb and neutralize the content of sulfur dioxide of the flue gas.

However, in most known processes for the desulfurization of flue gas the purification is carried out using a slurry of lime or limestone in fresh water as absorbent. With these processes operational trouble arises in the gas scrubber due to scale formation causes by precipitation of calcium carbonate, calcium sulfite and calcium sulfate. These purification processes yield as end product more or less water-containing calcium sulfite and/or calcium sulfate for which a deposition site might be difficult to find at several locations. Below a so called "lime/gypsum" process will be described (B. Colliander, "Status Report per April 1, 1978 concerning desulfurization of flue gas. Prepared for the coal consequence board in Denmark") in which the suspension, also often called "the slurry", from the scrubbing tower is supplied to an oxidation unit in which gypsum is formed according to equations 9, 10 and 11.

$$CaSO_3(s) \rightleftharpoons Ca^{2+} + SO_3^{2-} \quad (9)$$

$$SO_3^{2-} + \tfrac{1}{2}O_2 \rightarrow SO_4^{2-} \quad (10)$$

$$SO_4^{2-} + 2H_2O + Ca^{2+} \rightarrow CaSO_4 \cdot 2H_2O(s) \quad (11)$$

The gypsum is removed and the solution returned to the gas scrubbers. The pH value of the suspensions from the gas scrubber is kept at 4.0–5.0. The pH value is then adjusted to 3.5–4.5 by the addition of $H_2SO_4$ in order to promote the oxidation in the subsequent process step. The sulfur dioxide is essentially present as undissolved calcium sulfite in the liquid from the gas scrubber. This means that undissolved calcium sulfite must be dissolved before the oxidation reaction can take place.

It has been mentioned above that a high pH gives increased rate of oxidation. In this system the solution of calcium sulfite is determining for the total rate of reaction and, accordingly, pH must be lowered to 3.5–4.5 in order to promote the dissolution of the calcium sulfite. Thus, the pH is maintained at a level at which the oxidation reaction is slow and, accordingly, it is necessary with long residence times for the liquid in the oxidation unit.

In the advent of the present invention extensive investigations have been made in order to provide a method for absorbing $SO_2$ in seawater with subsequent treatment of the $SO_2$-containing seawater, whereby (1) the essential portion of the excess of acid in the $SO_2$-containing seawater is reduced by the addition of calcium based alkali in the form of CaO, $Ca(OH)_2$ or $CaCO_3$.

(2) An essential portion of the content of sulfur dioxide in the seawater is transformed into sulfate by the addition of an oxygen-containing gas.

(3) The pH of the liquid is maintained at a favourable level both with regard to the oxidation reaction and for expelling $CO_2$ from the liquid.

The amount of seawater for the absorption and the subsequent treatment may be kept relatively small according to the present method. Thereby the decarbonation/oxidation reactor and a possible effluent arrangement will be significantly smaller than for the seawater processes described. The end product from the $SO_2$ purification process according to the invention is seawater which may be returned to the recipient without risk for the marine environment. The invention is of particular interest in connection with coal or oil fired power plants and correspondingly fired industrial boilers. However, the invention is not restricted to use in connection with one particular industry.

SUMMARY OF THE INVENTION

According to the present invention there is provided a method for absorbing sulfur oxides from flue gases, wherein the sulfur oxides are absorbed in seawater and calcium based alkali in the form of CaO, $Ca(OH)_2$ or $CaCO_3$ is added to the seawater used for the absorption, whereupon the seawater to which alkali has been added is introduced into a decarbonation-oxidation reactor to which an oxygen-containing gas is supplied, and removing the decarbonated and oxidized seawater from the reactor, which comprises using the seawater for the absorption, and for possible supply subsequent to the addition of alkali, in a such amount that the amount of sulfur dioxide dissolved in the seawater which is introduced into the decarbonation-oxidation reactor is substantially higher than the total alkalinity of the seawater, adding calcium based alkali in a manner known per se to the seawater used for absorption, in a such amount that the pH of the seawater becomes higher than 5.2 prior to introducing the seawater into the decarbonation-oxidation reactor, and controlling the pH of the seawater subsequent to the decarbonation-oxidation reactor by the addition of calcium based alkali until a pH above 5.5.

DETAILED DESCRIPTION OF THE INVENTION

Normally, seawater has a salinity of from 32 to 36°/··. However, the invention may be used even though the seawater has a higher or lower salinity than from 32 to 36°/··, however, the water shall not have a lower salinity than 10°/··.

In power plants combusting coal/oil having a sulfur content of from 1 to 3%, according to the invention normally about 1/5 of the amount of cooling water from the turbine condensers will be used in the gas scrubber. The invention is not restricted thereto that the seawater has been used as cooling water prior to its introduction into the gas scrubber, however, this will often be the case. The seawater from the gas scrubber then contains from 250 to 700 mg $SO_2$ $_{tot}$/liter ($SO_2$ $_{tot}$=$SO_2(1)+HSO_3^-+SO_3^{2-}$), and its pH is from 1.8 to 3.3.

Lime (CaO), calcium hydroxide ($Ca(OH)_2$) or limestone ($CaCO_3$) is introduced in measured amounts at least at two places, viz. before and after the decarbonation-oxidation reactor. CaO and $Ca(OH)_2$ are added in a such measured amount before the reactor that $$\frac{\text{number of moles of active } Ca^{2+} \text{ added}}{\text{number of moles of } SO_2 \text{ added}}$$

is from 0.3 to 0.8. When using limestone this ratio will be from 0.4 to 0.9.

Due thereto that the absorbed amount of $SO_2$ in the seawater is substantially higher than the amount which corresponds to the natural alkalinity of the seawater a lowering of pH due to the oxidation reaction will counteract the increase in pH due to the decarbonation. Accordingly, the pH of the seawater will decrease when the seawater passes through the decarbonation-oxidation reactor, and normally from a pH of about 6 to a pH of about 5.

The solubility of calcium sulfite, calcium sulfate and the alkalinity of the seawater decrease with decreasing salinity. When utilizing the invention at locations where the seawater has low salinity and in cases where the concentration of $SO_2$ in the seawater from the gas scrubber is high, it may be necessary to supply an additional amount of seawater before the decarbonation-oxidation reactor in order to avoid precipitation of calcium sulfite and simultaneously maintaining a favourable pH value for the oxidation reaction. In such cases it may also be of interest to use more than two places for the addition of alkali and more than one decarbonation-oxidation reactor.

A possible extra amount of added seawater is supplied subsequent to the first measured addition of lime and not prior to the measured addition of lime. This sequence is preferred rather than the opposite sequence because the conditions for dissolving the alkali are then most favourable. The reason for this is that the liquid in which alkali is to be dissolved would then be as acid as possible and because the equipment for the solution of the lime may then have a smaller size because the amount of liquid in which the alkali is to be dissolved will then be the smallest possible.

When extra seawater has been added prior to the reactor, the content of $SO_2$ in the seawater will normally be from 280 to 400 mg $SO_2$ $_{tot}$ per liter using seawater having a salinity of from 32–40°/··. The content of $SO_2$ which is introduced into the reactor is in any case to be substantially higher than the amount of $SO_2$ corresponding to the total alkalinity of the seawater, so that the ratio: "acid addition due to the content of $SO_2$, calculated as milliequivalents per liter: the natural alkalinity of the seawater, calculated as milliequivalents per liter" is higher than 2.6:1.

The phrase "acid addition due to the content of $SO_2$, calculated as milliequivalents per liter" is calculated in the following manner:

$$\text{moles } SO_{2tot} \text{ per liter} \times 2 \times 1000.$$

Following the reactor the substantial proportion of the sulfur dioxide content of the liquid has been oxidized to sulfate. This means that more alkali may be added without problems of growth arising due to precipitation of calcium sulfite. The liquid may then be transferred to and discharged into the recipient by means of a suitable discharge arrangement.

Alkali is added in measured amounts after the reactor so that "number of moles of active $Ca^{2+}$ added/number of moles of $SO_2$ added" is from 0.1 to 0.7 when CaO and/or $Ca(OH)_2$ are added and from 0.1 to 1.1 when $CaCO_3$ is added.

The sum of the addition of alkali prior to and subsequent to the reactor is to be so that "total number of moles of active $Ca^{2+}$ added/total number of moles of $SO_2$ added" is from 0.5 to 1.0 when CaO and/or $Ca(OH)_2$ are used and from 0.6 to 1.5 when $CaCO_3$ is used.

The dosage of alkali subsequent to the reactor is determined by the solubility of calcium sulfite and the requirements to pH and degree of oxidation of the effluent.

The addition of alkali to the seawater following the reactor is made so that the pH of the seawater will be at least 5.5 for environmental reasons.

Normally, seawater is a strong electrolyte having an ionic strength of about 0.7. The chemical activity of the ions decreases in such a system. This is conducive thereto that the solubility of calcium sulfite, calcium sulfate and calcium carbonate in seawater is much higher than in fresh water. In the system described it will only be possible for calcium sulfite to precipitate. This means that in this system calcium based alkali may be added in substantially larger amounts and until substantially higher pH values than in a system of calcium based alkali/fresh water, without growth problems arising due to precipitation of calcium sulfite/calcium sulfate.

By means of the system described the following advantages are obtained:

(1) A favourable pH value for the oxidation reaction throughout the reactor even at high degree of oxidation.

(2) A high sulfite concentration because pH is high, because the total concentration of sulfur dioxide is high and because the sulfite is present as ions and not as precipitated calcium sulfite. This is conducive to a high rate of reaction.

(3) The oxidation reaction will be very quickly initiated. This is of particular importance because, as mentioned, the reaction is catalyzed by one or more of the intermediate products of the reaction.

In the decarbonation-oxidation reactor air is added in order to promote stripping of $CO_2$ and the oxidation reaction. The seawater is to be the continuous phase, and the liquid is to advance approximately as a plug flow. Beyond this the invention is not restricted to any particular type of reactor nor to any particular supply system.

Because the seawater in the reactor is maintained at a pH which is also favourable to the stripping of the $CO_2$ the natural alkalinity of seawater is utilized in a better manner and less alkali must be supplied in order to obtain a certain pH in the liquid following the reactor. This also means that the consumption of alkali in the present method is less than in the lime/gypsum process described even though the pH of the seawater by means of additional alkali following the reactor is increased to the pH value of the seawater prior to the absorption therein of sulfur dioxide. Seawater normally contains some catalyzing polyvalent cations, inter alia Fe, Mn, Cu and Co. A catalyst in the form of e.g. iron sulfate may, however, also be added prior to the reactor. The recycling of liquid across the reactor will also increase the rate of reaction because, as mentioned, the reaction is catalyzed by one or more intermediate products. However, the invention is not restricted to the addition of catalyst or to recycling.

EXAMPLE

Acid seawater in an amount of 6 m³/h was transferred from the liquid outlet from a scrubbing tower in which $SO_2$ was removed from flue gas from an oil fired boiler and to a pilot plant. The salinity of the seawater was 34.1 g/kg and its alkalinity was 2.38 milliequivalents per liter. The total concentration of sulfur dioxide ($SO_2(1)+HSO_3^-+SO_3^{2-}$) in the acid seawater was 293 mg per liter, pH was 2.9, the temperature was 17.8° C. and the oxygen concentration was 3.8 mg per liter. Calcium hydroxide (in an amount of 1359 g/h) and ferric sulfate (4.0 g $Fe_2(SO_4)_3$/h) were added before the seawater was supplied to a decarbonation-oxidation reactor. "Number of moles of $Ca^{2+}$ added/number of moles of $SO_2$ added" was 0.67. The pH of the liquid was 6.2 after the addition of alkali. The reactor had a diameter of 50 mm and a length of 350 mm. Air (3 m³/h) was supplied to the seawater immediately before the reactor. The reactor was filled with mixing elements which served to obtain good dispersion of the air in the liquid. A straight outlet tube having a diameter of 40 mm and a length of 25 m led from the reactor. Because the air was dispersed in the liquid the conditions for oxidation and decarbonation were favourable also along the entire length of the tube. The residence time for the liquid in the reactor and in the tube was about 20 seconds. Following the tube the pH of the seawater was 5.0, the $O_2$ content was 4.5 mg per liter and the $SO_2$ concentration was 55 mg per liter. This corresponds to a degree of oxidation of 81.2%. Calcium hydroxide (233 g/h) was added after the liquid had passed through the tube, in order to increase the pH of the liquid to 6.0. The ratio "total number of moles of $Ca^{2+}$ added/number of moles of $SO_2$ added" was then 0.78. The addition of calcium hydroxide corresponds to 7.14 milliequivalents per liter and, accordingly, is significantly higher than the amount which corresponds to the natural alkalinity of the seawater.

What is claimed is:

1. A method of absorbing sulfur oxides from flue gases by contacting said flue gases with seawater, said method comprising using seawater for said absorption of sulfur oxides in an amount such that subsequent to said absorption the pH of said seawater is from 1.8 to 3.3, treating said seawater after absorbing said sulfur oxides with a calcium based alkali chosen from the group consisting of CaO, $Ca(OH)_2$, and $CaCO_3$, in an amount such that the pH of said sulfur oxide-containing seawater is greater than 5.2, subjecting said seawater to a reactor into which an oxygen-containing gas is fed whereby said sulfur oxides are oxidized and carbon dioxide is stripped from said seawater, and adjusting the pH of said decarbonated and oxidized seawater subsequent to said decarbonation-oxidation reactor to above 5.5 by addition to said seawater of calcium based alkali selected from the group consisting of CaO, $Ca(OH)_2$, and $CaCO_3$.

2. A method as claimed in claim 1, characterized in that alkali is added to the seawater prior to the decarbonation-oxidation reactor in such an amount that the $$\frac{\text{number of moles of active } Ca^{2+} \text{ added}}{\text{number of moles of } SO_2 \text{ added}}$$

is from 0.3 to 0.9.

3. A method as claimed in claim 1, characterized in that alkali is added subsequent to the decarbonation-oxidation reactor in such an amount that the $$\frac{\text{number of moles of active } Ca^{2+} \text{ added}}{\text{number of moles of } CO_2 \text{ added}}$$

is from 0.1 to 1.1.

4. A method as claimed in claim 2, characterized in that alkali selected from the group consisting of CaO and $Ca(OH)_2$ is added to the seawater prior to the decarbonation-oxidation reactor in such an amount that the $$\frac{\text{number of moles of active } Ca^{2+} \text{ added}}{\text{number of moles of } SO_2 \text{ added}}$$

is from 0.3 to 0.8.

5. A method as claimed in claim 2, characterized in that alkali in the form of limestone is added to the seawater prior to the decarbonation-oxidation reactor in such an amount that the $$\frac{\text{number of moles of active } Ca^{2+} \text{ added}}{\text{number of moles of } SO_2 \text{ added}}$$

is from 0.4 to 0.9.

6. A method as claimed in claim 3, characterized in that alkali selected from the group consisting of CaO and $Ca(OH)_2$ is added subsequent to the decarbonation-oxidation reactor in such an amount that the $$\frac{\text{number of moles of active } Ca^{2+} \text{ added}}{\text{number of moles of } SO_2 \text{ added}}$$

is from 0.1 to 0.7.

7. A method as claimed in claim 3, characterized in that alkali in the form of limestone is added subsequent to the decarbonation-oxidation reactor in such an amount that the $$\frac{\text{number of moles of active } Ca^{2+} \text{ added}}{\text{number of moles of } SO_2 \text{ added}}$$

is from 0.1 to 1.1.

8. A method as claimed in claim 2, characterized in that alkali is added to the seawater prior to the decarbonation-oxidation reactor in such an amount that the pH of the liquid entering the reactor is about 6.0.

9. A method as claimed in claim 1 wherein said treatment with said calcium based alkali includes addition of seawater, which has not been used to absorb sulfur oxide, in order to attain a pH of greater than 5.2 prior to said oxidation reaction.

* * * * *